United States Patent [19]

Light

[11] Patent Number: 4,627,523
[45] Date of Patent: Dec. 9, 1986

[54] FLUID COUPLING DEVICE WITH IMPROVED FLUID COOLING

[75] Inventor: Gerard M. Light, Marshall, Mich.

[73] Assignee: Eaton Corporation, Cleveland, Ohio

[21] Appl. No.: 789,599

[22] Filed: Oct. 21, 1985

[51] Int. Cl.$^4$ ............................................. F16D 35/00
[52] U.S. Cl. .............................. 192/58 B; 192/113 A; 192/113 B
[58] Field of Search ............. 192/58 B, 113 A, 113 B, 192/70.12

[56] References Cited

U.S. PATENT DOCUMENTS

| | | |
|---|---|---|
| 3,059,745 | 10/1962 | Tauschek . |
| 3,727,735 | 4/1973 | La Flame . |
| 3,856,122 | 12/1974 | Leichliter . |
| 3,993,415 | 11/1976 | Hauser ............................ 192/113 A |
| 4,064,980 | 12/1977 | Tinholt ............................. 192/58 B |
| 4,351,426 | 9/1982 | Bopp ................................ 192/58 B |
| 4,437,554 | 3/1984 | Haeck .............................. 192/58 B |
| 4,531,621 | 7/1985 | Hazel ............................... 192/58 B |

FOREIGN PATENT DOCUMENTS 1060143  3/1967  United Kingdom .

Primary Examiner—William F. Pate, III
Assistant Examiner—R. Chilcot
Attorney, Agent, or Firm—C. H. Grace; L. J. Kasper

[57] ABSTRACT

A fluid coupling device is disclosed of the type including a coupling assembly (13) including a housing member (15) and a cover member (17), the members (15) and (17) including flange portions (61) and (63). The flange portion (63) defines an annular fluid cooling recess (65). Fluid is directed from the operating chamber (33) by means of a fluid-directing member (69) through an inlet opening (67) into the recess (65). Fluid flows circumferentially around the coupling device through the recess (65), with heat being transmitted from the fluid to the flange portion (63) and then dissipated. At the end of the recess (65), the fluid engages an end wall (75) which directs the fluid into an outlet passage (77) and back into the operating chamber. The fluid cooling recess has no direct communication with the fluid reservoir chamber (37).

10 Claims, 6 Drawing Figures

4,627,523

FLUID COUPLING DEVICE WITH IMPROVED FLUID COOLING

BACKGROUND OF THE DISCLOSURE

The present invention relates to rotary torque-transmitting fluid coupling devices, and more particularly to such devices wherein the ability to dissipate heat and cool the viscous fluid represents a limiting factor on the torque-transmitting capability of the device.

Rotary fluid coupling devices of the type which may utilize the present invention have found several uses, the most common of which is to drive the cooling fan associated with the radiator of vehicle engines. Such coupling devices are frequently referred to as "viscous fan drives" because they utilize a high-viscosity fluid to transmit torque, by means of viscous shear drag, from an input coupling member (clutch) to an output coupling member (housing) to which is bolted the cooling fan.

This invention is especially advantageous when used on a relatively high-torque viscous fan drive, i.e., one which is capable of transmitting anywhere from about 2 horsepower to about 12 horsepower to the cooling fan. Typically, the clutch and the housing define a plurality of interdigitated lands and grooves which define the shear space. When this shear space is filled with viscous fluid, torque is transmitted from the clutch to the housing, in response to rotation of the clutch.

During torque transmission, substantial heat is generated as a result of the shearing of the viscous fluid between the lands and grooves. The amount of heat generated is proportional to the "slip" speed of the fan drive, i.e., the difference between the speed of the clutch and the speed of the housing. It is generally well understood by those skilled in the art that the ability to transmit torque is limited by the ability of the device to dissipate the heat generated as a result of the viscous shear. If the temperature of the viscous fluid exceeds a certain maximum temperature, the result will be a deterioration in the viscous properties of the fluid, resulting in a loss of torque-transmitting capability of the fluid.

U.S. Pat. No. 3,856,122, assigned to the assignee of the present invention, discloses a fluid coupling device in which the clutch defines a pair of arcuate channels through which fluid is pumped from the working chamber back to the reservoir chamber. However, in the coupling device of U.S. Pat. No. 3,856,122, the housing comprises the input and the clutch comprises the output. Therefore, the arcuate channels are in a location which would result in some cooling of the fluid whereas, in a conventional fluid coupling device in which the clutch is the input and the housing is the output, such channels would not be in a position relative to the flow of ram air, to provide substantial cooling.

SUMMARY OF THE INVENTION

Accordingly, it is an object of the present invention to provide a fluid coupling device having improved capability to dissipate heat and cool the viscous fluid, thereby increasing the torque-transmitting capacity of the device.

It is a more specific object of the present invention to provide a fluid coupling device including a fluid chamber, separate from the operating chamber and the reservoir chamber, wherein heat is dissipated from the fluid flowing through the chamber.

The above and other objects of the present invention are accomplished by the provision of a fluid coupling device comprising a first rotatable coupling assembly defining an axis of rotation, and enclosure means associated with the first coupling assembly to define a fluid chamber therebetween. A valve means is associated with the first coupling assembly and disposed to separate the fluid chamber into a fluid operating chamber and a fluid reservoir chamber. A second rotatable coupling member is disposed in the operating chamber and is rotatable relative to the first coupling assembly. The valve means is operable to control the flow of fluid between the reservoir chamber and the operating chamber.

The improved fluid coupling device is characterized by:

(a) The first coupling assembly defines a cooling fluid chamber disposed radially-outwardly from the fluid operating chamber, the cooling fluid chamber including an inlet opening and an outlet opening. The inlet opening and the outlet opening comprise substantially the only fluid communication between the operating chamber and the cooling fluid chamber.

(b) A first fluid directing means is disposed adjacent the fluid operating chamber and is operable to direct fluid through the inlet opening into the cooling fluid chamber in response to relative rotation between the first coupling assembly and the second coupling member.

(c) A second fluid directing means is disposed adjacent the outlet opening and is operable to direct fluid through the outlet opening into the operating chamber in response to relative rotation between the first coupling assembly and the second coupling member.

(d) The cooling fluid chamber is configured to extend circumferentially about a substantial portion of the operating chamber, whereby a substantial amount of heat is transferred to the first coupling assembly from fluid flowing through the cooling fluid chamber.

DESCRIPTION OF THE PREFERRED EMBODIMENT

Figure 1:
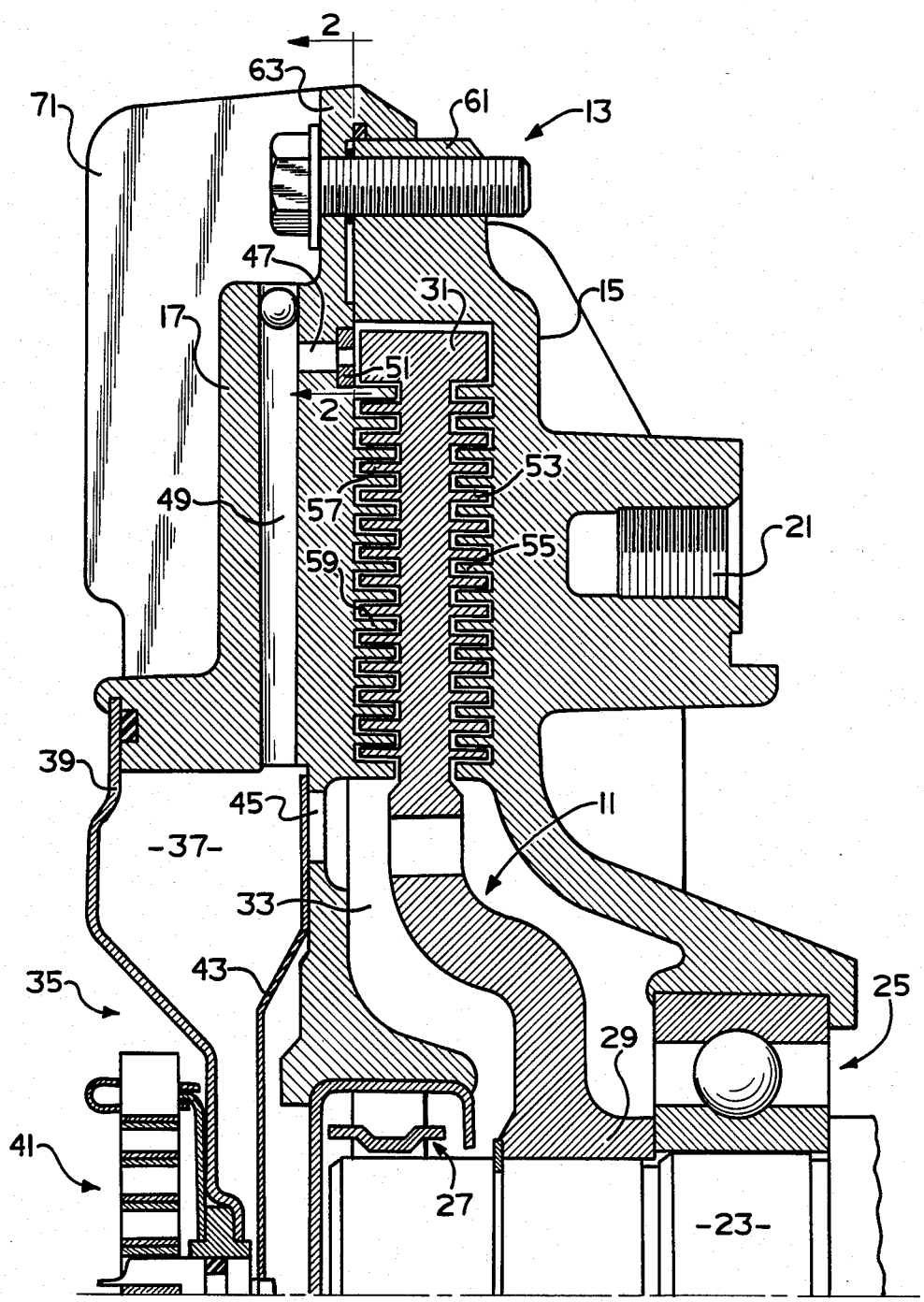
FIG. 1 is an axial cross-section illustrating the upper half of a typical fluid coupling device of the type with which the present invention may be utilized.

Referring now to the drawings, which are not intended to limit the invention, FIG. 1 illustrates one preferred form of a fluid coupling device of the type in which the present invention may be utilized. The fluid coupling device includes an input coupling member, generally designated 11, and an output coupling assembly, generally designated 13. The output coupling assembly 13 includes a housing member 15 and a cover member 17, the members 15 and 17 being secured together by a plurality of bolts 19. The fluid coupling device is adapted to be driven by a vehicle engine, and in turn, drives a vehicle engine accessory, such as a radiator cooling fan (not shown) which may be bolted to the housing member 15 by means of a plurality of threaded bores 21 formed in the member 15. It should be understood, however, that the use of the present invention is not limited to any particular fluid coupling device configuration or application, except as specifically noted hereinafter.

The coupling device includes an input shaft 23 on which the input coupling member 11 is mounted. The input shaft 23 functions as a support for the inner race of a bearing set 25 which is seated on the inside diameter of the housing member 15, while the forward end (left end in FIG. 1) of the input shaft 23 serves as the inner race for a roller bearing set 27, which is seated on the inside diameter of the cover member 17.

The input coupling member 11 is generally annular and includes a hub portion 29 and an annular, disk-like portion 31. The hub portion 29 is pressed onto an intermediate portion of the input shaft 23, such that rotation of the input shaft 23 causes rotation of the input coupling member 11.

The housing member 15 and the cover member 17 cooperate to define a fluid operating chamber 33 within which the input coupling member 11 is rotatably disposed. The cover member 17 cooperates with a cover assembly generally designated 35 to define a fluid reservoir chamber 37 therebetween. In serving to separate the operating chamber 33 from the reservoir chamber 37, the radially inner portion of the cover member 17 comprises part of the "valve means" of the device.

The cover assembly 35 includes a stamped cover member 39 defining a central aperture which receives a temperature-responsive valve control assembly, generally designated 41, the construction and operation of which are well known to those skilled in the art. The assembly 41 is operable to control the movement of a valve arm 43. As is also well known to those skilled in the art, movement of the valve arm 43 controls the flow of fluid from the reservoir chamber 37 into the operating chamber 33 through a fill opening 45, which is formed in the cover member 17.

The cover member 17 defines an axial passage 47 in communication with the operating chamber 33, and a radial passage 49 which provides fluid communication from the axial passage 47 to the reservoir chamber 37. Disposed adjacent the axial passage 47 is a pumping element (wiper) 51 which is operable to engage the relatively rotating fluid in the operating chamber 33 and generate a localized region of relatively higher fluid pressure. The result is that a small quantity of fluid is continually pumped back into the reservoir chamber 37 through the passages 47 and 49, as is well known in the art.

In the subject embodiment, the rearward surface of the disk-like portion 31 forms a plurality of annular lands 53 and the adjacent surface of the housing member 15 forms a plurality of annular lands 55, the lands 53 and 55 being interdigitated to define a shear space therebetween. Similarly, the forward surface of the portion 31 forms a plurality of annular lands 57, while the adjacent surface of the cover member 17 defines a plurality of annular lands 59, the lands 57 and 59 being interdigitated to define a shear space therebetween. It should be understood by those skilled in the art that the present invention is not limited to a fluid coupling device of the type having interdigitated lands. However, coupling devices which have interdigitated lands generally have relatively greater torque-transmitting capacity than those not having such lands, and the invention is especially suited for such high-torque coupling devices.

Referring still primarily to FIG. 1, a brief description will be given of the fluid flow path during normal operation of the coupling device when the ambient temperature at the control assembly 41 indicates a need for operation of the device. When operation of the fan is indicated by the ambient temperature, the control assembly 41 moves the valve arm 43 to a position uncovering at least partially the fill opening 45, thus permitting fluid to flow from the reservoir chamber 37 into the operating chamber 33. The fluid entering the operating chamber 33 flows between both the rearward lands 53 and 55, as well as the forward lands 57 and 59, filling both the forward and rearward shear spaces. As a result, torque is transmitted from the input coupling member 11 to the output coupling assembly 13. Continually, a small portion of the fluid in the operation chamber 33, toward the outer periphery of the coupling member 11, is pumped from the operating chamber back to the reservoir chamber as described previously.

Referring still to FIG. 1, it may be seen that the housing member 15 includes a radially-outer flange portion 61, while the cover member 17 includes a radially-outer flange portion 63, the flange portions 61 and 63 being maintained in face-to-face sealing engagement by means of the bolts 19.

Figure 2:
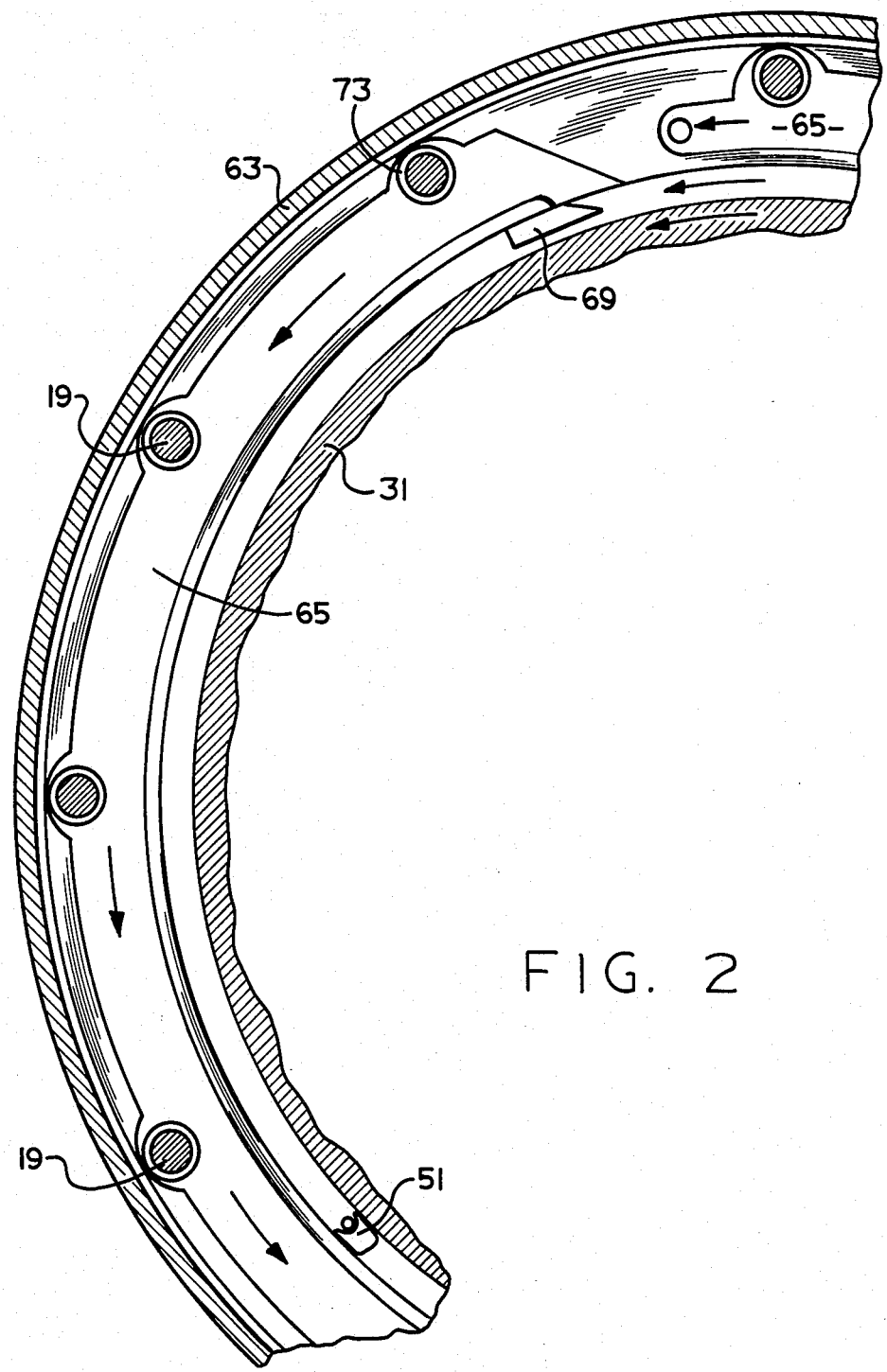
FIG. 2 is a fragmentary, transverse cross-section taken on line 2—2 of FIG. 1, and on a different scale, illustrating primarily the flange portion of the cover member, including the cooling fluid chamber.

Referring now to FIG. 2, in conjunction with FIG. 1, the flange portion 63 defines a generally annular recess 65, the primary function of which is to serve as a cooling fluid chamber, i.e., a chamber through which fluid flows, in parallel with the operating chamber, and transfer heat to the flange portion 63 of the cover member 17 at a location at which relatively more efficient heat dissipation occurs.

Although FIG. 2 is fragmentary, it may be seen that the recess 65 extends circumferentially about substantially the entire flange portion 63.

Figure 3:
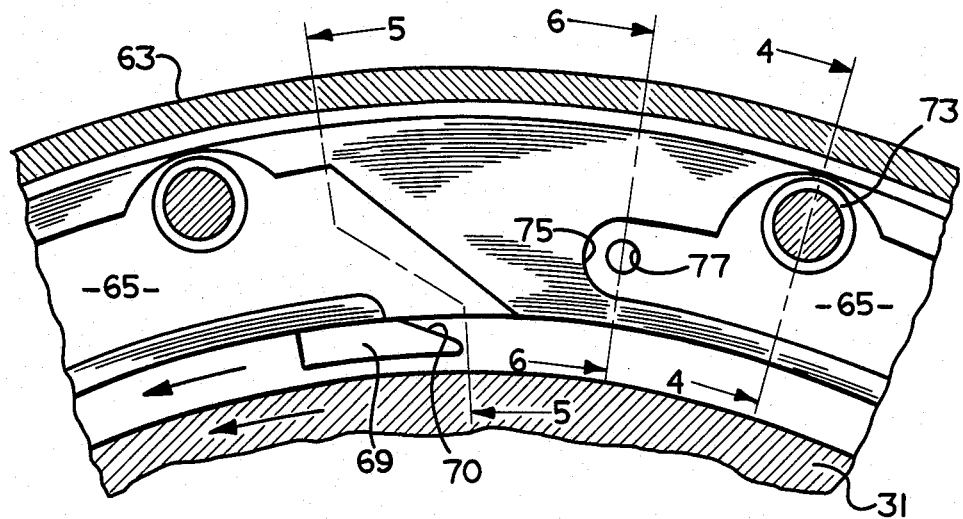
FIG. 3 is an enlarged, fragmentary transverse cross-section, similar to FIG. 2, illustrating in greater detail one portion of the present invention.

Referring now primarily to FIG. 3, the invention will be described in greater detail. It should first be noted, in viewing FIG. 3, that the input coupling member 11 (and disk-like portion 31) are rotating counterclockwise relative to the output coupling assembly 13 and the cover member 17. Therefore, fluid disposed between the outer periphery of the coupling member 11 and the coupling assembly 13 also moves counterclockwise relative to the coupling assembly 13 (see arrows).

Figure 5:
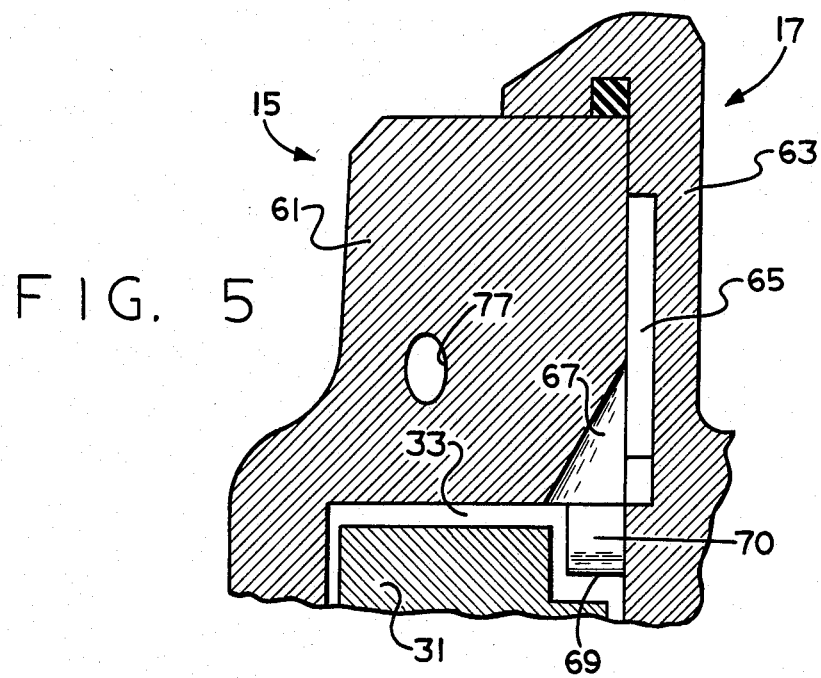
FIG. 5 is an enlarged, axial cross-section, similar to FIG. 1, taken on line 5—5 of FIG. 3.

Referring still to FIG. 3, in conjunction with FIG. 5, the annular recess 65 is in fluid communication with the operating chamber 33 by means of an inlet opening 67, which is preferably defined by the housing member 15. Disposed within the operating chamber 33, and adjacent the inlet opening 67, is a fluid-directing member 69, which is illustrated herein as including a wedge-shaped portion, defining an inclined face 70, but it will be understood by those skilled in the art that the member 69 may have any configuration which is effective to direct fluid through the inlet opening 67 into the recess 65, in response to relative rotation between the coupling member 11 and coupling assembly 13.

As fluid enters the annular recess 65, it flows counterclockwise through the recess, around substantially the entire circumferential extent of the coupling device. As the fluid flows through the revcess 65, a substantial amount of heat is transmitted from the fluid in the recess 65 to the adjacent flange portion 63, and from there the heat is dissipated by means of a plurality of cooling fins 71, as is well known to those skilled in the art.

Figure 4:
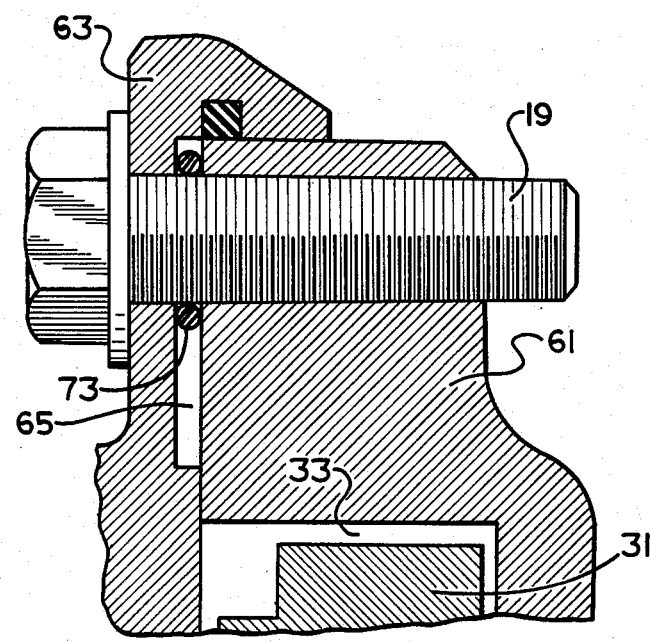
FIG. 4 is an enlarged, axial cross-section, similar to FIG. 1, taken on line 4—4 of FIG. 3.

Referring now to FIG. 4, in conjunction with FIG. 3, it should be noted that the annular recess extends around each of the bolts 19 in the subject embodiment, with each of the bolts 19 being surrounded by an annular O-ring 73, the function of which is to prevent leakage of fluid from the recess 65 through the space between the bolt 19 and the flange portion 63.

Figure 6:
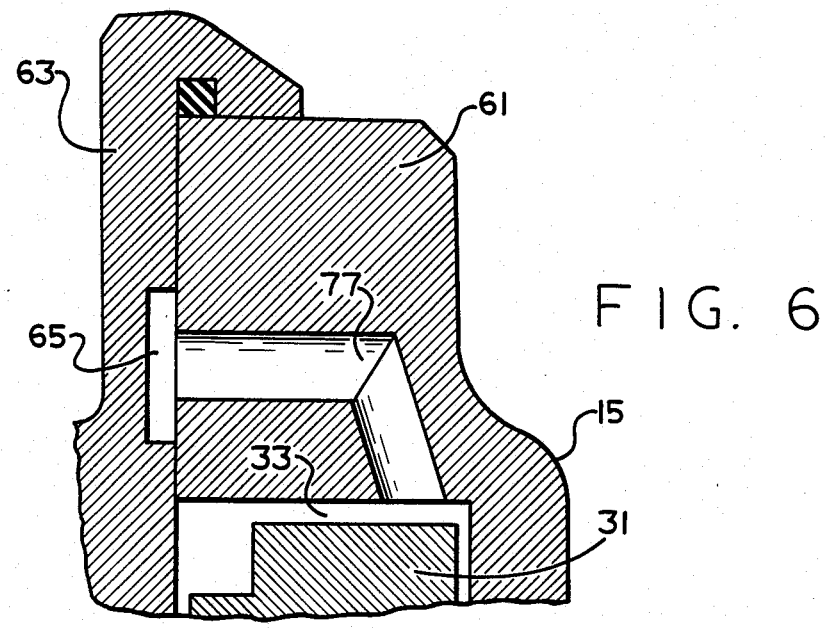
FIG. 6 is an enlarged, generally axial cross-section, similar to FIG. 1, taken on line 6—6 of FIG. 3.

Referring now primarily to FIG. 6, in conjunction with FIG. 3, it may be seen that as fluid flows circumferentially around the device, through the recess 65, it eventually reaches the end of the recess 65 and impacts the curved end wall 75 (see FIG. 3), which acts as a fluid directing means thus causing a localized region of pressure buildup in much the same manner as is caused by the pumping element 51. Disposed adjacent the end of the recess 65 is an outlet passage 77, shown in FIG. 6 as being defined by the housing member 15. The outlet passage 77 communicates the relatively cooler fluid from the end of the annular recess 65 back into the operating chamber 33. Preferably, the outlet passage 77 extends in a generally downstream (arrows in FIG. 3) direction such that the passage 77 communicates with the operating chamber 33 at a location downstream of the inlet opening 67, to minimize short-circuiting of cooled fluid from the recess 65 to the operating chamber 33 and right back into the recess 65. Note that in FIG. 5, which is a true axial cross-section, the passage 77 cuts across the plane of FIG. 5, at an angle. Furthermore, it may be seen in FIG. 6 that the cooled fluid is communicated to the rearward portion of the operating chamber 33 (right end in FIG. 6), whereas the inlet opening 67 is disposed adjacent the forward portion of the operating chamber.

Therefore, the present invention provides a fluid coupling device having improved fluid cooling and heat dissipation capability. More specifically, the invention provides an annular fluid cooling recess 65 which is separate from the operating chamber 33 and separate from the reservoir chamber 37, whereby heat is transmitted from the fluid in the recess 65 to the flange portion 63, and thereafter dissipated.

It is anticipated that various alterations and modifications of the invention will become apparent to those skilled in the art upon a reading and understanding of the foregoing specification. It is intended to include all such alterations and modifications as part of the invention, insofar as they come within the scope of the appended claims.

I claim:

1. A fluid coupling device comprising a first rotatable coupling assembly defining an axis of rotation, enclosure means associated with said first rotatable coupling assembly to define a fluid chamber therebetween, valve means associated with said first rotatable coupling assembly and disposed to separate said fluid chamber into a fluid operating chamber and a fluid reservoir chamber, a second rotatable coupling member disposed in said fluid operating chamber and being rotatable relative to said first rotatable coupling assembly, said valve means being operable to control the flow of fluid between said reservoir chamber and said operating chamber, characterized by:

(a) said first coupling assembly defining a cooling fluid chamber disposed radially outwardly from said fluid operating chamber, said cooling fluid chamber including an inlet opening and an outlet opening, said inlet opening and said outlet opening comprising substantially the only fluid communication between said operating chamber and said cooling fluid chamber;

(b) first fluid directing means disposed adjacent said fluid operating chamber and being operable to direct fluid through said inlet opening into said cooling fluid chamber in response to relative rotation between said first coupling assembly and said second coupling member;

(c) second fluid directing means disposed adjacent said outlet opening and being operable to direct fluid through said outlet opening into said operating chamber in response to relative rotation between said first coupling assembly and said second coupling member; and (d) said cooling fluid chamber being configured to extend circumferentially about a substantial portion of said operating chamber, whereby a substantial amount of heat is transferred to said first coupling assembly from fluid flowing through said cooling fluid chamber.

2. A fluid coupling device as claimed in claim 1 characterized by said cooling fluid chamber comprising a generally annular chamber concentric about said axis of rotation.

3. A fluid coupling device as claimed in claim 1 characterized by said first rotatable coupling assembly comprising a housing member and a cover member, each of said housing member and said cover member including a flange portion, said flange portions being disposed in face-to-face sealing engagement with each other radially outwardly of said fluid operating chamber.

4. A fluid coupling device as claimed in claim 3 characterized by said flange portions of said housing member and said cover member cooperating to define said cooling fluid chamber.

5. A fluid coupling device as claimed in claim 4 characterized by said cooling fluid chamber comprising said flange portion of said cover member defining a generally annular recess in the surface disposed in said face-to-face engagement with said flange portion of said housing member.

6. A fluid coupling device as claimed in claim 1 characterized by said valve means comprising a partition member disposed to separate said fluid chamber into said operating chamber and said reservoir chamber, said partition member defining a fluid inlet port through which fluid flows from said reservoir chamber into said operating chamber, said valve means further comprising pump means operable to pump fluid from said operating chamber to said reservoir chamber in response to relative rotation between said first coupling assembly and said second coupling member.

7. A fluid coupling device as claimed in claim 1 characterized by said relative rotation between said first coupling assembly and said second coupling member defining a downstream direction of fluid flow, relative to said first coupling assembly, said fluid flowing through said cooling fluid chamber flowing in said downstream direction.

8. A fluid coupling device as claimed in claim 7 characterized by said cooling fluid chamber comprising a generally annular chamber extending circumferentially about substantially the entire operating chamber.

9. A fluid coupling device as claimed in claim 8 characterized by said second fluid directing means and said outlet opening including passage means disposed to provide fluid communcation from said outlet opening to said operating chamber at a location downstream of said first fluid directing means.

10. A fluid coupling device comprising a first rotatable coupling assembly defining an axis of rotation, enclosure means associated with said first rotatable coupling assembly to define a fluid operating chamber therebetween, a second rotatable coupling member disposed in said fluid operating chamber and being rotatable relative to said first rotatable coupling assembly, characterized by:
 (a) said first coupling assembly defining a cooling fluid chamber disposed radially-outwardly from said fluid operating chamber, said cooling fluid chamber including an inlet opening and an outlet opening, said inlet opening and said outlet opening comprising substantially the only fluid communication between said operating chamber and said cooling fluid chamber;
 (b) first fluid directing means disposed adjacent said fluid operating chamber and being operable to direct fluid through said inlet opening into said cooling fluid chamber in response to relative rotation between said first coupling assembly and said second coupling member;
 (c) second fluid directing means disposed adjacent said outlet opening being operable to direct fluid through said outlet opening into said operating chamber in response to relative rotation between said first coupling assembly and said second coupling member; and
 (d) said cooling fluid chamber being configured to extend circumferentially about substantially the entire operating chamber, whereby a substantial amount of heat is transferred to said first coupling assembly from fluid flowing through said cooling fluid chamber.

* * * * *